US012713354B2

(12) United States Patent
Mondal et al.

(10) Patent No.: US 12,713,354 B2
(45) Date of Patent: Aug. 18, 2026

(54) SYSTEMS AND METHODS FOR EFFICIENT POWER MANAGEMENT AT A RADIO UNIT

(71) Applicant: HFCL Limited, Bangalore (IN)

(72) Inventors: Subhas Chandra Mondal, Bangalore (IN); Parag Aggarwal, Bangalore (IN)

(73) Assignee: HFCL Limited, Bangalore (IN)

( * ) Notice: Subject to any disclaimer, the term of this patent is extended or adjusted under 35 U.S.C. 154(b) by 311 days.

(21) Appl. No.: 18/422,663

(22) Filed: Jan. 25, 2024

(65) Prior Publication Data

US 2024/0259945 A1 Aug. 1, 2024

(30) Foreign Application Priority Data

Jan. 28, 2023 (IN) ............................ 202341005647

(51) Int. Cl.
*H04W 52/02* (2009.01)

(52) U.S. Cl.
CPC ..... *H04W 52/0248* (2013.01); *H04W 52/028* (2013.01)

(58) Field of Classification Search
CPC ........... H04W 52/0248; H04W 52/028; H04W 52/0206; H04W 52/0216; H04W 52/0229; Y02D 30/70
See application file for complete search history.

(56) References Cited

U.S. PATENT DOCUMENTS 9,419,568 B2 8/2016 Beltran Lizarraga
9,742,446 B2 8/2017 Yang et al.
10,404,166 B2 9/2019 Khesbak et al.
10,778,151 B2 9/2020 Khlat
10,778,152 B2 * 9/2020 Lyalin ........................ H03F 1/32
2014/0140337 A1 * 5/2014 Seo ................... H04W 56/0015 370/350
2015/0293574 A1 * 10/2015 Ehsan ................. H04W 52/029 713/320
2018/0081420 A1 * 3/2018 Jones .................... G06F 1/3243
2025/0351068 A1 * 11/2025 Wang .................... H04L 5/0053

* cited by examiner

*Primary Examiner* — Farid Seyedvosoghi
(74) *Attorney, Agent, or Firm* — The Roy Gross Law Firm, LLC; Roy D. Gross

(57) ABSTRACT

Systems and methods for efficient power management in a wireless communication network are described. In particular, the system (for example, implemented at a radio unit) may monitor a downlink traffic at the radio unit in the wireless communication network. Further, the system may determine a low traffic state of the radio unit based on a pre-defined threshold of the monitored downlink traffic for a pre-configured time period. Furthermore, the system may configure the radio unit to enter a low power state based on the determined low traffic state. As such, the system may select a power consumption policy and apply the selected power consumption policy at the radio unit for efficient power management in the wireless communication network. Therefore, the radio unit may intelligently take decisions related to power consumption.

14 Claims, 8 Drawing Sheets

SYSTEM
202

POWER SUPPLY UNIT
204

MEMORY
206

INTERFACE(S)
208

RF FRONT END UNIT
222

PA 1
224-1

PA 2
224-2

PA N
226-N

LNA 1
226-1

LNA 2
226-2

LNA N
226-N

OTHER UNIT(S)
228

OAM UNIT
210

DETECTION UNIT
212

COMMUNICATION UNIT
214

M-PLANE STACK
214-1

OTHER UNIT(S)
214-2

ACTIVATION UNIT
216

TRAFFIC PREDICTION UNIT
218

PROCESSOR(S) OR CONTROLLER(S)
220

DATABASE
230

SYSTEMS AND METHODS FOR EFFICIENT POWER MANAGEMENT AT A RADIO UNIT

TECHNICAL FIELD

The present disclosure, in general, relates to managing power consumption in a wireless communication network, and in particular, relates to approaches for efficient power management at a radio unit, for example, a fifth generation (5G) new radio (NR) radio unit.

BACKGROUND

The following description of the related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of the prior art.

A wireless radio channel suffers from high attenuation as the distance from a transmitter increases. The attenuation is higher at higher frequencies. In order to increase the inter-site distance of base stations, the transmit signal strength is boosted with a high-power amplifier (PA) to withstand the high attenuation. This makes the PA a vital component in any base station. In the fifth-generation (5G) new radio (NR) base station, the PA consumes more power to fulfil the demand for high traffic-streaming bitrates and high quality of service (QOS). Generally, the PA operates in a saturation region for high power efficiency. However, operating the PA in the saturation region causes non-linearity. A multi-carrier modulation scheme such as orthogonal frequency division multiplexing (OFDM) is susceptible to non-linear distortion due to its high peak to average power ratio (PAPR). As a result, the PA of a high-power transmitter needs to ensure linearity over an extended range. For example, a 5G macro base station with 40 Watt (46 dBm) output power at an antenna port needs to ensure linearity until 316 Watt or 55 dBm (46 dBm+9 dB) with 9 dB PAPR.

Further, 5G also offers multi-antenna-based multiple input multiple output (MIMO) and beamforming features that demand more complex transceiver systems to provide high system capacity. The power consumption goes up as the number of transceiver chains increase. As the 5G network is expected to offer better power efficiency than its predecessor, it urgently needs to optimize power consumption.

A radio unit (RU) at the base station with multiple radio frequency (RF) transceiver chains offers an opportunity to control the transmission power level based on the network demand from the end users. In addition, the 5G time division duplex (TDD) system offers the PA an opportunity to operate at a low power state during uplink. However, the current systems do not make the best use of these possibilities to minimize power consumption. The existing systems do not adequately address the power reduction possibilities, when the data demand is low within the coverage area, and/or when the user density is low, and network utilization is below a threshold. In effect, the current systems do not consider the state of network traffic demand to intelligently control the state of the PA and transmitter chain and optimize power consumption without any performance degradation.

There is, therefore, a need in the art to provide systems and methods that can overcome the shortcomings of the current mechanisms.

OBJECTS OF THE PRESENT DISCLOSURE

Some of the objects of the present disclosure, which at least one embodiment herein satisfies are as listed herein below.

It is an object of the present disclosure to provide an efficient solution for minimizing power consumption at a fifth generation (5G) base station, i.e., a radio unit.

It is an object of the present disclosure to optimize power consumption without any performance degradation.

It is an object of the present disclosure to consider the state of network traffic demand to intelligently control a state of a power amplifier and a transmitter chain for power consumption at a radio unit.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a method for managing power consumption in a wireless communication network. The method may include monitoring, by a processor, a downlink traffic at a radio unit in the wireless communication network, determining, by the processor, a low traffic state of the radio unit based on a pre-defined threshold for the monitored downlink traffic for a pre-configured time period, and configuring, by the processor, the radio unit to enter a low power state based on the determined low traffic state. The method may include selecting, by the processor, a power consumption policy, and applying, by the processor, the selected power consumption policy at the radio unit for a pre-defined time period.

In an embodiment, the method may include determining, by the processor, the downlink traffic at the radio unit at a current time instance, and estimating, by the processor, a predicted downlink traffic at the radio unit for a pre-defined time interval. The current time instance may be prior to the pre-defined time interval. In an embodiment, the estimating of the predicted downlink traffic may be based on historical data pattern of the downlink traffic at the radio unit. In an embodiment, the method may include determining, by the processor, the low traffic state of the radio unit based on whether a difference between the downlink traffic at the current time instance and the predicted downlink traffic for the pre-defined time interval is within a pre-defined confidence interval.

In an embodiment, the method may include, in response to a positive determination, applying, by the processor, the power consumption policy at the radio unit for a first time period, else applying, by the processor, the power consumption policy at the radio unit for a second time period. The second time period may be greater than the first time period.

In an embodiment, the power consumption policy may include at least one of a first power consumption policy, a second power consumption policy, and a third power consumption policy.

In an embodiment, the method may include selecting, by the processor, the power consumption policy based on a power saving potential of each of the first power consumption policy, the second power consumption policy, and the third power consumption policy. In an embodiment, the third power consumption policy may be a combination of the first power consumption policy and the second power consumption policy.

In an embodiment, the method may include applying, by the processor, the first power consumption policy at the radio unit based on the selection. In such an embodiment, the method may include identifying, by the processor, a number of active antenna ports to be turned off, and sending, by the processor, a message to a distributed unit in the wireless communication network. The message may indicate an intent for the radio unit to enter the low power state with the identified number of active antenna ports entering into the low power state. In an embodiment, the method may include receiving, by the processor, a response from the distributed unit, where the response may indicate that resource remapping to available antenna ports is completed, and configuring, by the processor, the radio unit to turn off the identified number of antenna ports.

In an embodiment, the method may include configuring, by the processor, the radio unit to switch power amplifiers associated with the identified number of antenna ports to an idle state.

In an embodiment, the method may include applying, by the processor, the second power consumption policy at the radio unit based on the selection. In such an embodiment, the method may include identifying, by the processor, a number of downlink slots to be reduced, and sending, by the processor, a message to a distributed unit indicating an intent for the radio unit to enter the low power state with the number of downlink slots entering into the low power state. In an embodiment, the method may include receiving, by the processor, a response from the distributed unit, where the response may indicate that resource remapping to available downlink slots is completed, and configuring, by the processor, the radio unit to reduce the identified number of downlink slots.

In an aspect, the present disclosure relates to a system for managing power consumption in a wireless communication network. The system may include a processor and a memory coupled to the processor, where the memory may include processor-executable instructions that when executed by the processor causes the processor to monitor a downlink traffic at a radio unit in the wireless communication network, determine a low traffic state of the radio unit based on a pre-defined threshold for the monitored downlink traffic for a pre-configured time period, and configure the radio unit to enter a low power state based on the determined low traffic state. In an embodiment, the processor may be configured to select a power consumption policy and apply the selected power consumption policy at the radio unit for a pre-defined time period.

In an aspect, the present disclosure relates to a radio unit for managing power consumption in a wireless communication network, where the radio unit may implement the system as described above.

In an aspect, the present disclosure relates to a non-transitory computer-readable medium comprising machine-readable instructions that are executable by a processor to perform the steps of the method as described above.

BRIEF DESCRIPTION OF DRAWINGS

The accompanying drawings, which are incorporated herein, and constitute a part of this disclosure, illustrate exemplary embodiments of the disclosed methods and systems which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes the disclosure of electrical components, electronic components, or circuitry commonly used to implement such components.

Figure 1A:
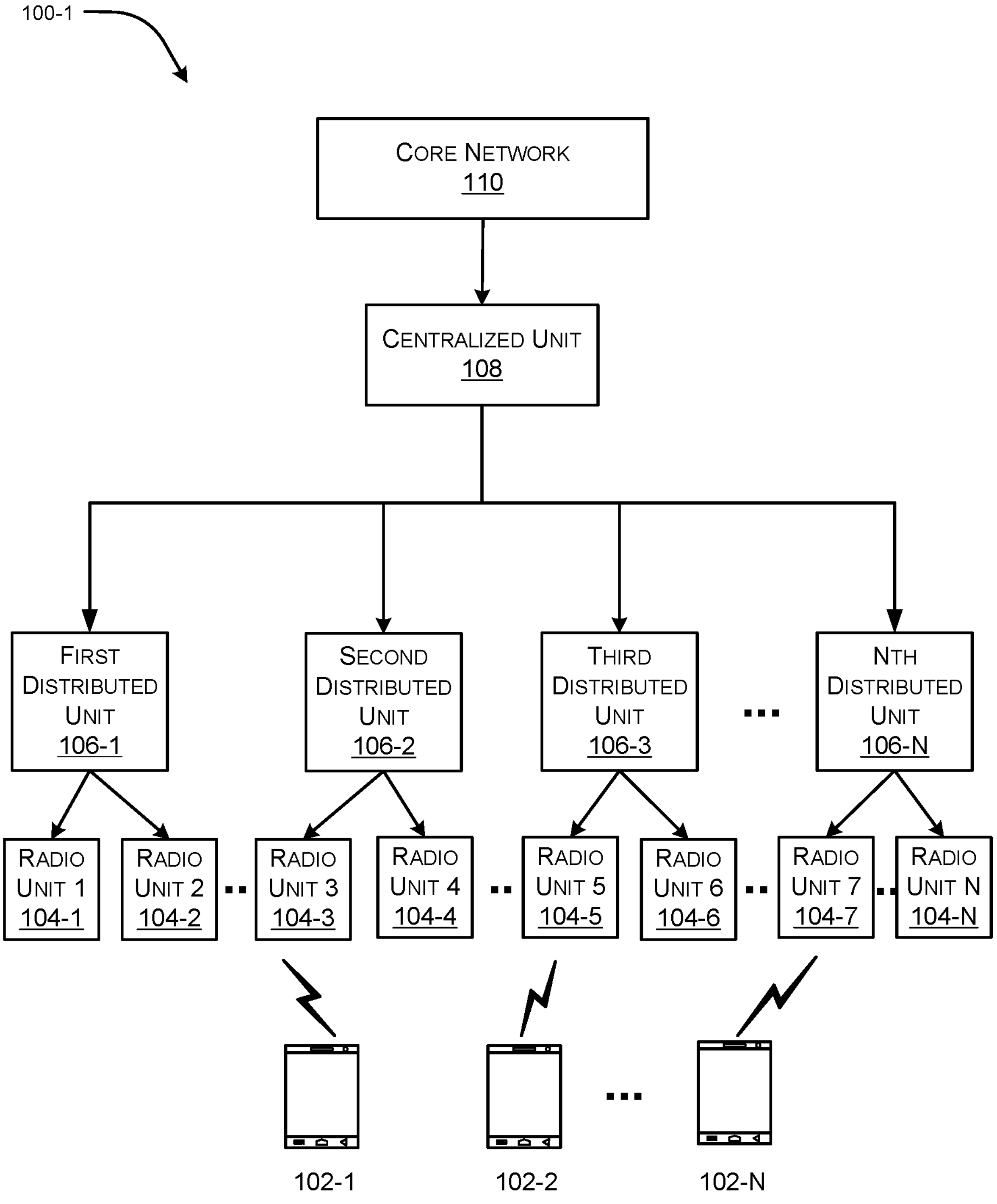
FIG. 1A illustrates an exemplary network architecture in which or with which the proposed mechanism may be implemented, in accordance with an embodiment of the present disclosure.

The foregoing shall be more apparent from the following more detailed description of the disclosure.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

Also, it is noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Further, to the extent that the terms "includes," "has," "contains," and other similar words are used in either the detailed description or the claims, such terms are intended to be inclusive in a manner similar to the term "comprising" as an open transition word without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a," "an," and "the" are intended to include the plural forms as well, unless the context indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The term "module" mentioned in this specification may refer to a program or an instruction that is stored in a memory and that can implement some functions. A "unit" mentioned in this specification may refer to a functional structure obtained through division based on logic. The "unit" may be implemented by only hardware, or implemented by a combination of software and hardware.

The term "a plurality of" mentioned in this specification means at least two. The term "and/or" describes an association relationship for describing associated objects and represents that three relationships may exist. For example, A and/or B may represent the following three cases: only A exists, both A and B exist, and only B exists. The character "/" generally indicates an "or" relationship between the associated objects.

The term "determining" and its variants may include calculating, extracting, generating, computing, processing, deriving, modelling, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The term "based on" does not mean "based only on," unless expressly specified otherwise. In other words, the phrase "based on" describes both "based only on" and "based at least on." The terms "connected," "coupled," and "communicatively coupled," and related terms may refer to direct or indirect connections. If the specification states a component or feature "may," "can," "could," or "might" be included or have a characteristic, that particular component or feature is not required to be included or have the characteristic.

The methods disclosed herein comprise one or more steps or actions for achieving the described method. Unless a specific order of steps or actions is required for proper operation of the method that is being described, the order and/or use of specific steps and/or actions may be modified without departing from the scope of the claims.

Multiple-input multiple-output (MIMO) may refer to a technique that uses multiple transmit antennas and/or multiple receive antennas to wirelessly transmit a signal across a wireless communication network, for example, two or four antennas at the transmitter and/or the receiver. Massive MIMO utilizes an even higher number of antennas than traditional MIMO, for example, tens or hundreds (8, 16, 32, 64, etc.) of antennas at the transmitter and/or the receiver. With the deployment of massive MIMO active radios in Third Generation Partnership Project (3GPP) Fifth Generation (5G) wireless networks, there is an increased power consumption in the digital signal processing block of the radio unit in 5G. While network operators can provide higher throughput using 5G networks, the associated increase in radio unit power consumption in 5G radios is undesirable. During off-peak times of the day or night, it is unnecessary to provide the high throughput capability. As such, it would be advantageous to have the capability to reduce the power consumption of the radio unit even at the expense of throughput capability.

Accordingly, the present disclosure relates to a system and a method for efficient power management in a wireless communication network. The various embodiments throughout the disclosure will be explained in more detail with reference to FIGS. 1-6.

FIG. 1A illustrates an exemplary network architecture 100-1 for implementing the proposed mechanism, in accordance with an embodiment of the present disclosure.

In particular, the exemplary network architecture 100-1 may represent a communication system such as a 5G or next-generation communications system. In an embodiment, the network architecture 100-1 may include one or more computing devices (102-1, 102-2 . . . 102-N), one or more radio units (104-1, 104-2 . . . 104-N), one or more distributed units (106-1, 106-2 . . . 106-N), a centralized unit 108, and a core network 110. The centralized unit 108 may communicate with the one or more distributed units (106-1, 106-2 . . . 106-N) in a wired or a wireless manner. Further, a first distributed unit 106-1 may communicate with a first radio unit 104-1 and a second radio unit 104-2. Similarly, a second distributed unit 106-2 may communicate with a third radio unit 104-3 and a fourth radio unit 104-4. Furthermore, the one or more computing devices (102-1, 102-2 . . . 102-N) may be communicatively connected to the one or more radio units (104-1, 104-2 . . . 104-N). For example, a first computing device 102-1 may be connected to the third radio unit 104-3. It may be appreciated that there can be any number of distributed units (106-1, 106-2 . . . 106-N) connected to the centralized unit 108. Further, there can be any number of radio units (104-1, 104-2 . . . 104-N) connected to each of the one or more distributed units (106-1, 106-2 . . . 106N). Similarly, there can be any number of computing devices (102-1, 102-2 . . . 102-N) connected to the one or more radio units (104-1, 104-2 . . . 104-N). A person of ordinary skill in the art may understand the one or more distributed units (106-1, 106-2 . . . 106-N) may be collectively referred as the distributed units 106 and individually referred as the distributed unit 106. Further, the one or more radio units (104-1, 104-2 . . . 104-N) may be collectively referred as the radio units 104 and individually referred as the radio unit 104. Similarly, the one or more computing devices (102-1, 102-2 . . . 102-N) may be collectively referred as the computing devices 102 and individually referred as the computing device 102.

In an embodiment, the computing devices 102 may move between different radio units 104, for example, from a first radio unit 104-1 to a second radio unit 104-2, both served by a first distributed unit 106-1. In an embodiment, the computing devices 102 may move between different distributed units 106, for example, from the first distributed unit 106-1 to the second distributed unit 106-2 and vice versa.

Referring to FIG. 1A, the centralized unit 108 and/or the distributed units 106 may be coupled to the core network 110 of an associated wireless network operator. In an embodiment, the centralized unit 108 may be responsible for centralized radio resource and connection management control. In another embodiment, the distributed units 106 may include a processing function for implementing a distributed user plane and process a physical layer function and a layer-2 function.

In an embodiment, the computing devices 102 may include, but not be limited to, a handheld wireless communication device (e.g., a mobile phone, a smart phone, a phablet device, and so on), a wearable computer device (e.g., a head-mounted display computer device, a head-mounted camera device, a wristwatch computer device, and so on), a Global Positioning System (GPS) device, a laptop computer, a tablet computer, or another type of portable computer, a media playing device, a portable gaming system, and/or any other type of computer device with wireless communication capabilities, and the like. In an embodiment, the computing devices 102 may communicate with the distributed units 106 via set of executable instructions residing on any operating system. In an embodiment, the computing devices 102 may include, but are not limited to, any electrical, electronic, electro-mechanical or an equipment or a combination of one or more of the above devices such as virtual reality (VR) devices, augmented reality (AR) devices, laptop, a general-purpose computer, desktop, personal digital assistant, tablet computer, mainframe computer, or any other computing device, wherein the computing device 102 may include one or more in-built or externally coupled accessories including, but not limited to, a visual aid device such as camera, audio aid, a microphone, a keyboard, input devices for receiving input from a user such as touch pad, touch enabled screen, electronic pen and the like.

It may be appreciated that the computing devices 102 may not be restricted to the mentioned devices and various other devices may be used.

Although FIG. 1A shows exemplary components of the network architecture 100-1, in other embodiments, the network architecture 100-1 may include fewer components, different components, differently arranged components, or additional functional components than depicted in FIG. 1A. Additionally, or alternatively, one or more components of the network architecture 100-1 may perform functions described as being performed by one or more other components of the network architecture 100-1.

Figure 1B:
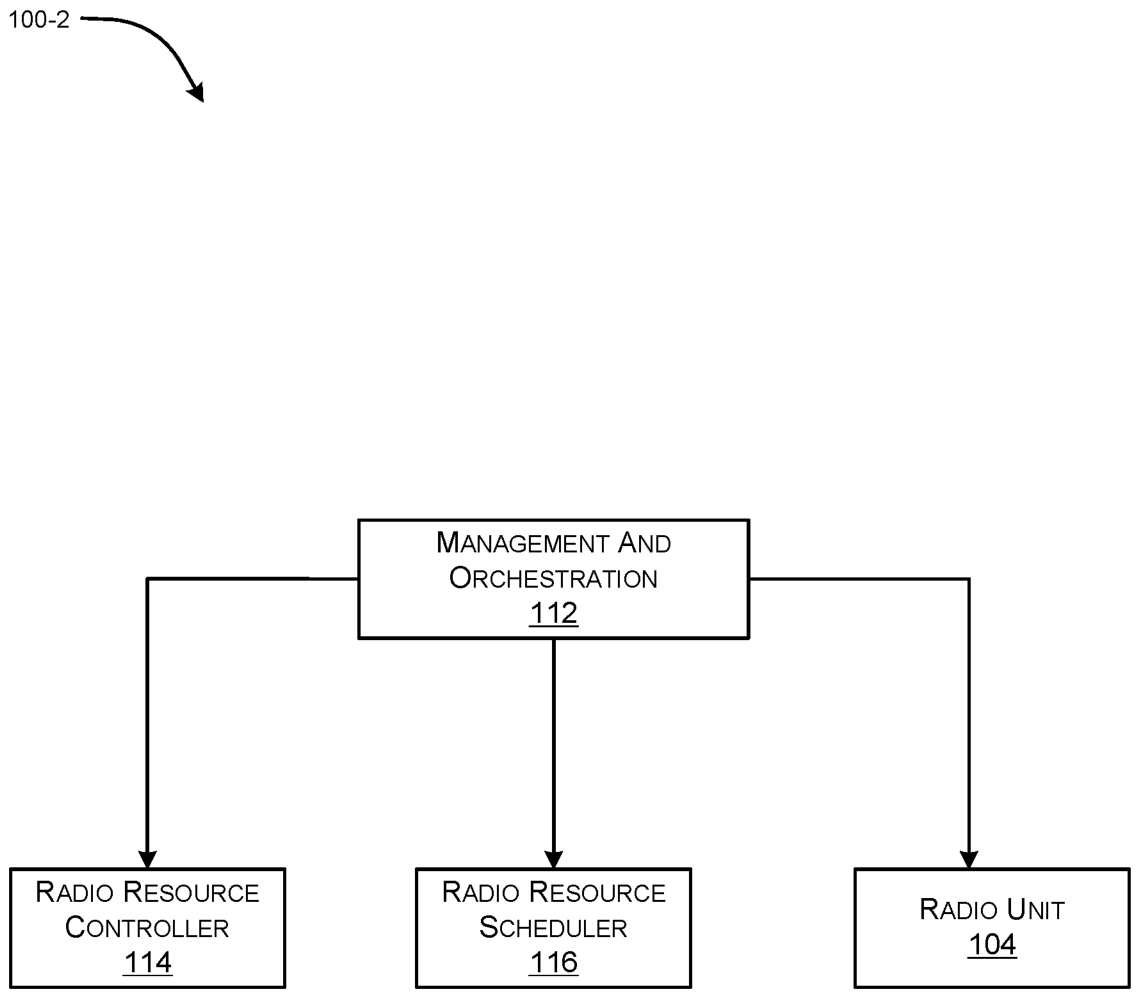
FIG. 1B illustrates an exemplary high-level system architecture of a radio access network, in accordance with an embodiment of the present disclosure.

FIG. 1B illustrates an exemplary high-level system architecture 100-2 of a radio access network (RAN), in accordance with an embodiment of the present disclosure.

In particular, the system architecture 100-2 of the RAN may include a management and orchestration unit 112, a radio resource controller 114, a radio resource scheduler 116, and a radio unit 104. It may be appreciated that the radio unit 104 of FIG. 1B may be similar to the radio unit 104 of FIG. 1A in its functionality. In an embodiment, the system architecture 100-2 may be implemented as a 5G New Radio (NR) RAN that supports a 5G NR wireless interface in accordance with the 5G NR specifications and protocols specified by the 3GPP and Open RAN (O-RAN). In an embodiment, in a disintegrated RAN architecture, the radio resource controller 114 may be implemented as a centralized unit such as the centralized unit 108 of FIG. 1A. Further, radio link control (RLC) and media access control (MAC) may be performed in the radio resource scheduler 116 that may be implemented as a distributed unit such as the distributed unit 106 of FIG. 1A.

Referring to FIG. 1B, the management and orchestration unit 112 may be communicatively coupled to the radio resource controller 114, the radio resource scheduler 116, and/or the radio unit 104. The management and orchestration unit 112 may send and receive management communications to and from the radio resource controller 114, which in turn forwards relevant management communications to and from the radio unit 104. A hierarchical architecture may be used for management-plane (M-plane) communications. When a hierarchical architecture is used, the management and orchestration unit 112 may send and receive management communications to and from the radio resource controller 114, which in turn forwards relevant M-plane communications to and from the radio unit 104 as needed. A direct architecture may be used for M-plane communications. When a direct architecture is used, the management and orchestration unit 112 may communicate directly with the radio unit 104, without having the M-plane communications forwarded by the radio resource controller 114 or the radio resource scheduler 116. A hybrid architecture may be used in which some M-plane communications are communicated using a hierarchical architecture and some M-plane communications are communicated using a direct architecture. Proprietary protocols and interfaces may be used for such M-plane communications. Also, protocols and interfaces that are specified by standards such as 5G specifications in 3GPP and O-RAN may be used for such M-plane communications. In an embodiment, the management and orchestration unit 112 may include a monitoring unit (not shown) that monitors a power state of the radio unit 104. In another embodiment, the monitoring unit may reside in the radio resource controller 112 (i.e. the centralized unit 108) or the radio resource scheduler 114 (i.e. the distributed unit 106).

Referring to FIG. 1B, the radio unit 104 may include or be coupled to one or more antennas (not shown) via which downlink radio frequency signals may be radiated to computing devices (for example, the computing devices 102 of FIG. 1A) and via which uplink radio frequency signals transmitted by the computing devices 102 may be received. In an embodiment, the radio unit 104 may take an input from the radio resource scheduler 116 (i.e., distributed unit 106) and transmit radio frequency signal(s) over the air interface (as shown in FIG. 1A). In an embodiment, the radio resource controller 114 may maintain a count of a number of connected users such as the computing devices 102 for each radio unit 104. Based on the number of connected computing devices 102, the radio resource controller 114 may control the radio resource scheduler 116 to schedule radio resources. In an embodiment, the radio resource scheduler 116 may determine an amount of data to be transmitted by the radio unit 104.

In an embodiment, downlink resource allocation is performed in a unit of sub frame and a group of physical resource blocks (PRBs). As an example, the below table depicts a resource grid within a timeslot considering sub-carrier spacing as 30 KHz.

TABLE 1

| | | | | | | | | | | | | | |
|---|---|---|---|---|---|---|---|---|---|---|---|---|---|
| 272 | | | | | | | | | | | | | |
| . | | | | | | | | | | | | | |
| . | | | | | | | | | | | | | |
| . | | | | | | | | | | | | | |
| . | | | $PRB_{m,n}$ | | | | | | | | | | |
| . | | | | | | | | | | | | | |
| . | | | | | | | | | | | | | |
| 3 | | | | | | | | | | | | | |
| 2 | | | | | | | | | | | | | |
| 1 | | | | | | | | | | | | | |
| 0 | 1 | 2 | 3 | 4 | 5 | 6 | 7 | 8 | 9 | 10 | 11 | 12 | 13 |

Y-AXIS
Resource Block ----> n
X-AXIS
OFDM Symbols in a timeslot --------> m

Further, as an example, the below table depicts a radio frame structure, i.e. 5G NR radio frame structure considering the sub-carrier spacing as 30 KHz.

TABLE 2

| TS 0 | TS 1 | TS 2 | TS 3 | TS 4 | TS 5 | TS 6 | TS 7 | TS 8 | TS 9 | TS 10 | TS 11 | TS 12 | TS 13 | TS 14 | TS 15 | TS 16 | TS 17 | TS 18 | TS 19 |
|---|---|---|---|---|---|---|---|---|---|---|---|---|---|---|---|---|---|---|---|
| SF 0 | | SF 1 | | SF2 | | SF 3 | | SF 4 | | SF 5 | | SF 6 | | SF 7 | | SF 8 | | SF 9 | |

Radio Frame duration = 10 ms

In an example embodiment, considering that there are 'n' active users (for example, computing devices 102) and 'm' number of PRBs are allocated to these 'n' active users at a given time. Further, considering that an average percentage of allocated PRBs against a total number of available PRBs is P %. In such an example embodiment, if the value of 'P' is below a pre-defined threshold for a sustained time period, then a base station or as such, the radio unit 104 in the system architecture 100-2 may be configured to take suitable actions to reduce power consumption. For example, if the average percentage of allocated PRBs, i.e. P is 75% for a period of 30 minutes, then the base station may be configured to take suitable actions to reduce the power consumption. A person of ordinary skill in the art will understand that the term base station may refer to any electronic device configured to receive and transmit radio frequency signals to provide wireless service to computing devices 102. Typically, base stations are in a fixed location, however other configurations are possible.

Therefore, in accordance with embodiments of the present disclosure, the proposed mechanism allows for efficient power management in the system architecture as depicted in FIG. 1B. In an effort to reduce power consumption at radio units 104, one or more power consumption and/or reduction step(s) may be implemented during low user traffic or no traffic. It may be appreciated that the power consumption and/or reduction step(s) described herein may be performed in any sequence or combination.

In accordance with embodiments of the present disclosure, one or more power consumption and/or reductions step(s) may be activated in one or more radio units 104, for example, when data demand is low within a coverage area. Additionally or alternatively, power consumption and/or reduction step(s) may be triggered when user density is low and network utilization is below a threshold, which is explained in more detail throughout the disclosure.

Although FIG. 1B shows exemplary components of the network architecture 100-2, in other embodiments, the network architecture 100-2 may include fewer components, different components, differently arranged components, or additional functional components than depicted in FIG. 1B. Additionally, or alternatively, one or more components of the network architecture 100-2 may perform functions described as being performed by one or more other components of the network architecture 100-2.

Figure 2:
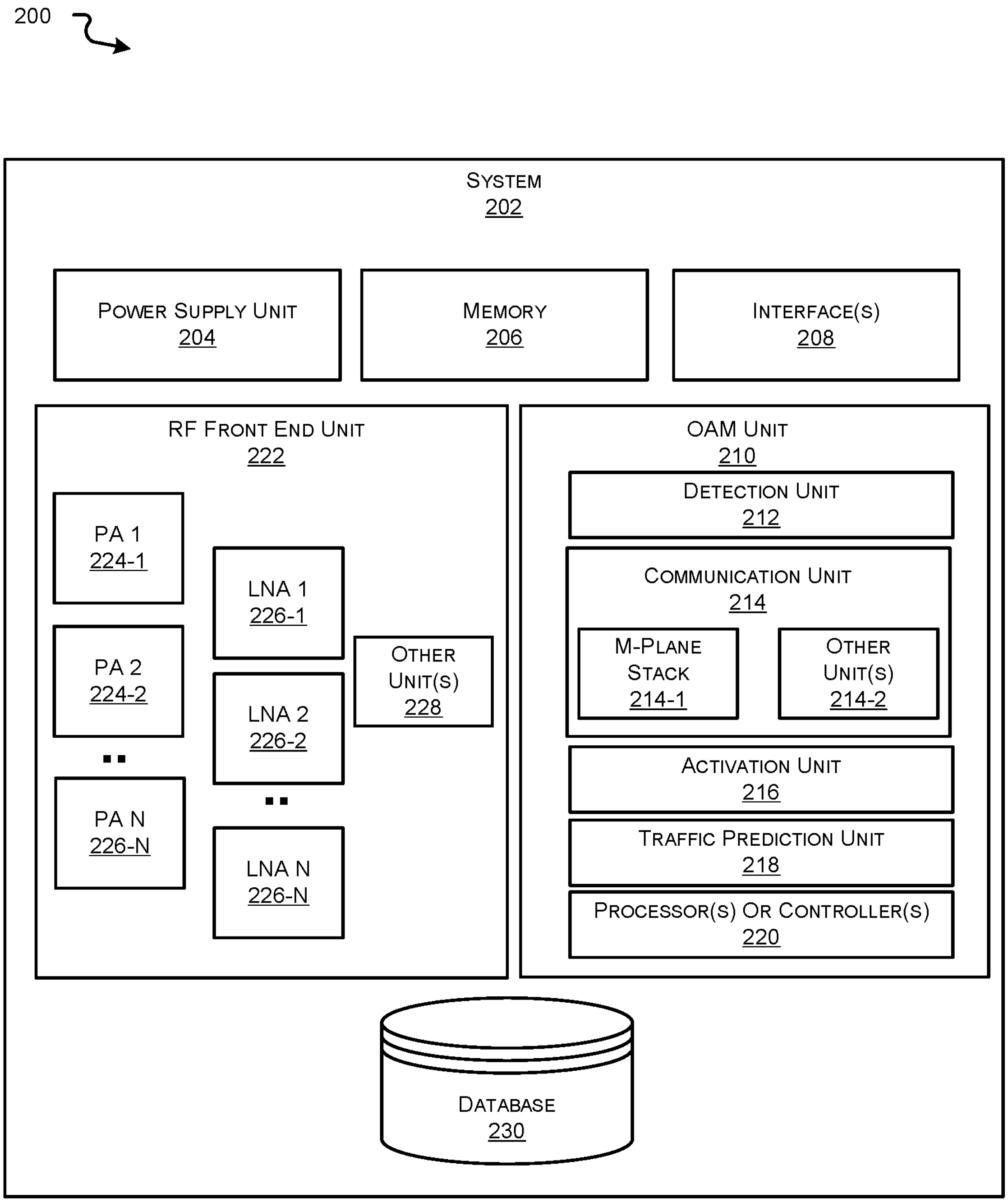
FIG. 2 illustrates an exemplary block diagram of a system for implementing the proposed mechanism, in accordance with an embodiment of the present disclosure.

FIG. 2 illustrates an exemplary block diagram 200 of a system for implementing the proposed mechanism, in accordance with an embodiment of the present disclosure. In particular, FIG. 2 illustrates a block diagram representing functional units of the proposed system 202 for managing power consumption, in accordance with an embodiment of the present disclosure.

Referring to FIG. 2, the exemplary functional units of the system 202 may include a power supply unit 204, a memory 206, interface(s) 208, an operations, administration, and maintenance (OAM) unit 210, RF front end unit 222, and a database 230. In an embodiment, the power supply unit 204 may drive all components of the system 202. In an embodiment, the power supply unit 204 may switch the system 202 into a low power state and/or a high power state based on traffic conditions detected at the system 202.

Referring to FIG. 2, the OAM unit 210 may include a detection unit 212, a communication unit 214, an activation unit 216, a traffic prediction unit 218, and one or more processor(s) or controller(s) 220. The one or more processor(s) 220 may be implemented as one or more microprocessors, microcomputers, microcontrollers, digital signal processors, central processing units, logic circuitries, and/or any devices that manipulate data based on operational instructions. Among other capabilities, the one or more processor(s) 220 may be configured to fetch and execute computer-readable instructions stored in the memory 206 of the system 202. The memory 206 may store one or more computer-readable instructions or routines, which may be fetched and executed to create or share the data units over a network service. The memory 206 may include any non-transitory storage device including, for example, volatile memory such as random access memory (RAM), or non-volatile memory such as Erasable Programmable Read-only Memory (EPROM), flash memory, and the like.

In an embodiment, the detection unit 212 may detect a traffic condition at the system 202. The communication unit 214 may include an M-plane stack 214-1 and other unit(s) 214-2. In an embodiment, the M-plane stack 214-1 may facilitate communication of the OAM unit 210 with other components of the system 202 as well as other entities within the network architecture (for example, the network architecture 100-1 of FIG. 1A or 100-2 of FIG. 1B). Referring to FIG. 2, the activation unit 216 may switch the system 202 to a low power state or a high power state based on inputs from other units of the system 202 such as, the traffic prediction unit 218 and the power supply unit 204. In an embodiment, the OAM unit 210 may be connected to the management and orchestration unit 112 of FIG. 1B. In such an embodiment, the OAM unit 210 may be connected to the monitoring unit in the management and orchestration unit 112. Further, the traffic prediction unit 218 may predict the traffic condition at the system 202, which is explained in detail throughout the disclosure.

In an embodiment, the RF front end unit 222 may include one or more power amplifiers (PAs) (224-1, 224-2 . . . 224-N), one or more low noise amplifiers (LNAs) (226-1, 226-2 . . . 226-N), and other unit(s) 228. The other unit(s) 228 may implement functionalities that supplement applications or functions performed by the system 202. In an embodiment, each of the one of more PAs (224-1, 224-2 . . . 224-N) may be coupled to one or more antennas (not shown) via which downlink radio frequency signals may be radiated to computing devices (for example, the computing devices 102 of FIG. 1A) and via which uplink radio frequency signals transmitted by the computing devices 102 may be received.

In an embodiment, the system 202 may also include the interface(s) 208. The interface(s) 208 may include a variety of interfaces, for example, interfaces for data input and output devices, referred to as I/O devices, storage devices, and the like. The interface(s) 208 may facilitate communication of the system 202 with various devices coupled to the system 202. The interface(s) 208 may also provide a communication pathway for one or more components of the system 202.

In an embodiment, the database 230 may include data that is either stored or generated as a result of functionalities implemented by any of the components of the system 202.

Continuing with the approaches of the working of the present subject matter, it may be noted that although the foregoing description will be explained with respect to a single radio unit such as the radio unit 104 of FIGS. 1A and 1B, it may be noted that the same is done only for the sake of clarity. The proposed approach for managing power consumption may be implemented to any number of radio units 104. All such examples would be covered within the scope of the present subject matter. In an example embodiment, the system 202 may be implemented as the radio unit 104. In such an embodiment, the radio unit 104 may be configured to manage its power consumption intelligently. For example, the system 202 and/or the radio unit 104 may detect network traffic condition at the radio unit 104, which is explained in more detail below.

In an embodiment, the radio unit 104 may receive radio frequency signals in the form of In-phase (I) and Quadrature-phase (Q) symbols, referred to as IQ symbols. In an O-RAN architecture, the IQ symbols may be transported over a fronthaul link to the radio unit 104 over an enhanced common public radio interface (eCPRI). In case of an integrated distributed unit and radio unit scenario, the IQ symbols may be transported over a CPRI. In an O-RAN 7.2× split, the distributed unit and the radio unit may be disaggregated over a fronthaul eCPRI. In an embodiment, the radio unit 104 may be an Open-RU (O-RU). A person of ordinary skill in the art may understand that the terms "radio unit" and "O-RU" may be used interchangeably throughout the disclosure.

In an embodiment, the radio unit 104 may maintain a plurality of counters to monitor traffic statistics of the data to be transmitted over one or more associated antennas. The downlink data to be transmitted over the antennas comes over the eCPRI link and the radio unit 104 measures user-plane (U-plane) data rate over a measurement window, for example, rx window measurement interval. This may be explained with help of an example configuration of the radio unit 104.

Example Configuration of Radio Unit 104

As an example, the radio unit 104 may have the following configuration:

Number of antenna ports: 8
O-RAN split option: Cat A
Number of MIMO layers: 4
Channel bandwidth: 100 MHZ
Numerology: 1 (sub-carrier spacing: 30 KHz)
Time division duplexing (TDD) slot pattern: 7D1S2U, S=10D2G2U The below table depicts an expected data rate of downlink fronthaul stream when all the PRBs are occupied.

TABLE 3

| Channel BW (Mhz) | Numerology | No. of subcarrier per PRB | No of PRB per OFDM symbol (number) | Number of OFDM symbols per timeslot (number) | Number of timeslots per radio frame (number) | Duration of radio frame (ms) | Duration of timeslot (ms) | OFDM symbol bitwidth (bits) | Split option |
|---|---|---|---|---|---|---|---|---|---|
| 100 | 1 | 12 | 273 | 14 | 20 | 10 | 0.5 | 104832 | 7.2x, Cat-A |
| 100 | 1 | 12 | 273 | 14 | 20 | 10 | 0.5 | 104832 | 7.2x, Cat-B |
| 50 | 1 | 12 | 133 | 14 | 20 | 10 | 0.5 | 51072 | 7.2x, Cat-A |
| 50 | 1 | 12 | 133 | 14 | 20 | 10 | 0.5 | 51072 | 7.2x, Cat-B |

TABLE 3-continued

| Channel BW (Mhz) | Number of MIMO layers | Number of Antenna port | Number of eCPRI streams | U plane datarate per stream (mbps) | TDD Slot Pattern | DL to total frame time ratio | Total U plane DL data rate (mbps) |
|---|---|---|---|---|---|---|---|
| 100 | 4 | 8 | 8 | 2935.296 | 7D1S2U | 0.77142857 | 18114.9696 |
| 100 | 4 | 8 | 4 | 2935.296 | 7D1S2U | 0.77142857 | 9057.4848 |
| 50 | 4 | 8 | 8 | 1430.016 | 7D1S2U | 0.77142857 | 8825.2416 |
| 50 | 4 | 8 | 4 | 1430.016 | 7D1S2U | 0.77142857 | 4412.6208 |

Based on the measurement data, downlink data rate may be calculated using the below equation:

$$\sum_{k=0}^{7}\left(\frac{rx\text{-window-}stats\text{.RX\_TOTAL}_{eaxcid\text{-}k}\ /}{rx\text{-window-measurement-intreval}}\right)*\text{packet-size}$$

Further, downlink occupancy may be calculated based on a ratio of the downlink data rate (calculated using above equation) and total U-plane downlink data rate. Considering that during off-peak hour, the data demand has reduced and only 100 PRBs are being scheduled on an average. Under this condition, the downlink occupancy may be calculated using the radio unit receive packet counter statistics and the radio unit operating configuration. As an example, if the downlink occupancy is 36.6% for a sustained time period, for example, 30 minutes, then the system 202 and/or the radio unit 104 may consider this to be a condition of sustained low traffic period. That is, the radio unit 104 may be configured to reduce the power consumption while still delivering the traffic without any impact on throughput demand from computing devices such as the computing devices 102 of FIG. 1A.

Referring to FIG. 2, the traffic prediction unit 218 may rely on historical data pattern for monitoring radio resource occupancy level at the radio unit 104.

As an example, the below table depicts an example data pattern over a 10 minute time interval for a period of 1 week.

TABLE 4

| Day/ Time | 0800 | 0810 | 0820 | 0830 | 0840 | 0850 | 0900 | 0910 | . . . |
|---|---|---|---|---|---|---|---|---|---|
| | Traffic occupancy | | | | | | | | |
| Mon | 30% | 31% | 34% | 34% | 35% | 35% | 37% | 36% | . . . |
| Tues | 35% | 28% | 29% | 31% | 33% | 34% | 35% | 37% | . . . |
| Wed | 28% | 34% | 30% | 32% | 33% | 35% | 37% | 36% | . . . |
| Thu | 30% | 36% | 35% | 33% | 35% | 37% | 37% | 38% | . . . |
| Fri | 32% | 29% | 30% | 32% | 33% | 35% | 36% | 37% | . . . |
| Sat | 20% | 21% | 22% | 24% | 25% | 25% | 27% | 27% | . . . |
| Sun | 20% | 22% | 24% | 24% | 25% | 27% | 29% | 30% | . . . |

As depicted in Table 4, there is a pattern for the traffic during weekdays and weekends. Further, there is a correlation of traffic level with time of the day. Based on this historical data pattern, the traffic prediction unit 218 may predict, with high confidence interval, how the traffic level will be during a given day and time. In an embodiment, the traffic prediction unit 218 may correlate this with the actual data traffic at the radio unit 104 at a particular time instance. For example, if the actual traffic at the radio unit 104 is within an error threshold, the radio unit 104 may be configured to apply a power consumption policy for power consumption and/or reduction. In an embodiment, the radio unit 104 may select the power consumption policy. In another embodiment, the radio unit 104 may select the power consumption policy based on a computation of power saving potential of the power consumption policy. In an embodiment, the system 202 may be configured to share summarized data trend (for example, 10 minute time interval) for a define time duration (for example, 1 week), as depicted in Table 4, of the radio unit 104 to an external management and orchestration unit (for example, the management and orchestration unit 112 of FIG. 1B) for network wide power optimization. In an embodiment, the defined time duration may include, but not be limited to, daily trend, weekly trend, monthly trend, and the like.

Referring to FIG. 2, the steps for power consumption and/or reduction may be performed by the system 202, and in particular, the exemplary functional components of the system 202. In another embodiment, the system 202 (including the exemplary functional components of FIG. 2) may be implemented at the radio unit 104 to enable the radio unit 104 to take decisions of power consumption and/or reduction. Therefore, by way of the present disclosure, the radio unit 104 may intelligently take appropriate decisions in order to manage power consumption in a wireless communication network. Additionally or alternatively, any suitable network device in the wireless communication network may implement the system 202 including the exemplary functional components as depicted in FIG. 2.

Therefore, in accordance with embodiments of the present disclosure, in order to efficiently manage power consumption in the wireless communication network, the processor 220 may monitor the downlink traffic at the radio unit 104, and determine a low traffic state of the radio unit 104 based on a pre-defined threshold for the monitored downlink traffic for a pre-configured time period. In an embodiment, the processor 220 may configure the radio unit 104 to enter a low power state based on the determined low traffic state. In order to configure the radio unit 104, the processor 220 may select a power consumption policy and apply the selected power consumption policy at the radio unit 104 for a pre-defined time period.

In an embodiment, in order to determine the low traffic state of the radio unit 104, the processor 220 may determine the downlink traffic at the radio unit 104 at a current time instance. In an embodiment, the processor 220 may estimate a predicted downlink traffic at the radio unit 104 for a pre-defined time interval. The current time instance may be prior to the pre-defined time interval. In an embodiment, the estimating of the predicted downlink traffic may be based on historical data pattern of the downlink traffic at the radio unit 104. In an embodiment, the processor 220 may determine the low traffic state of the radio unit 104 based on whether a difference between the downlink traffic at the current time instance and the predicted downlink traffic for the pre-defined time interval is within a pre-defined confidence interval. In response to a positive determination, the processor 220 may apply the power consumption policy at the radio unit 104 for a first time period. Else, the processor 220 may apply the power consumption policy at the radio unit 104 for a second time period. The second time period may be greater than the first time period.

In an embodiment, the power consumption policy may include, but not be limited to, a first power consumption policy, a second power consumption policy, and a third power consumption policy.

In an embodiment, the processor 220 may select the power consumption policy based on a power saving potential of each of the first power consumption policy, the second power consumption policy, and the third power consumption policy. In an embodiment, the third power consumption policy may be a combination of the first power consumption policy and the second power consumption policy.

In an embodiment, the processor 220 may apply the first power consumption policy at the radio unit 104 based on the selection. In such an embodiment, the processor 220 may identify a number of active antenna ports to be turned off. Further, the processor 220 may send a message to a distributed unit (for example, the distributed unit 106 of FIG. 1A). The message may indicate an intent for the radio unit 104 to enter the low power state with the identified number of active antenna ports entering into the low power state. In an embodiment, the processor 220 may receive a response from the distributed unit 106, where the response may indicate that resource remapping to available antenna ports is completed. Further, the processor 220 may configure the radio unit 104 to turn off the identified number of antenna ports. In an embodiment, the processor 220 may configure the radio unit 104 to switch power amplifiers associated with the identified number of antenna ports to an idle state.

In an embodiment, the processor 220 may apply the second power consumption policy at the radio unit 104 based on the selection. In such an embodiment, the processor 220 may identify a number of downlink slots to be reduced. Further, the processor 220 may send a message to the distributed unit 106 indicating an intent for the radio unit 104 to enter the low power state with the number of downlink slots entering into the low power state. In an embodiment, the processor 220 may receive a response from the distributed unit 106, where the response may indicate that resource remapping to available downlink slots is completed. Further, the processor 220 may configure the radio unit 104 to reduce the identified number of downlink slots.

In an embodiment, the processor 220 may apply the third power consumption policy at the radio unit 104 based on the selection. The third power consumption policy may be a combination of the first power consumption policy and the second power consumption policy, as described above.

All of these examples, along with some additional implementations and aspects, have been depicted more clearly in FIGS. 3-6.

Figure 3:
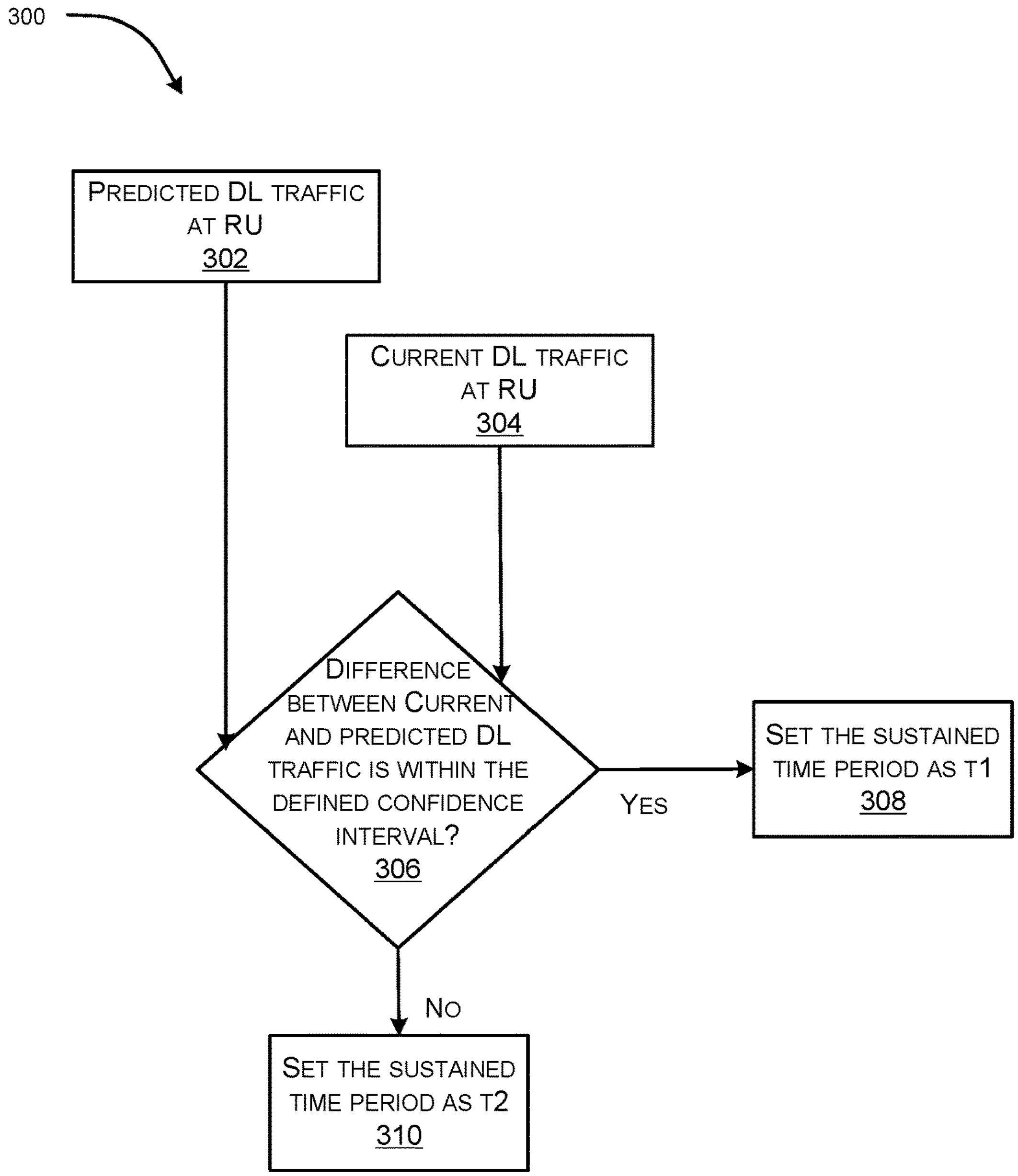
FIG. 3 illustrates an exemplary flow diagram of a method for adaptively identifying a sustained time period for power consumption strategy identification, in accordance with an embodiment of the present disclosure.

For example, FIG. 3 illustrates an exemplary flow diagram of a method 300 for adaptively identifying a sustained time period for power consumption strategy identification, in accordance with an embodiment of the present disclosure. It may be appreciated that the steps of the method 300 may be performed by the system 202. In another embodiment, the steps of the method 300 may be performed by the processor 220 of the system 202. In another embodiment, the steps of the method 300 may be performed by the radio unit 104.

Referring to FIG. 3, at step 302, the method 300 may include predicting a downlink traffic at the radio unit 104. In an embodiment, the method 300 may include predicting the downlink traffic at the radio unit 104 for a pre-defined time interval, for example, for 30 minutes. The prediction may be performed based on historical data pattern of the downlink traffic at the radio unit 104. In an embodiment, the prediction may be performed by a traffic prediction unit (for example, the traffic prediction unit 218 of FIG. 2).

At step 304, the method 300 may include determining a current downlink traffic. That is, the method 300 may include determining the downlink traffic at the radio unit 104 at a current time instance. Further, at step 306, the method 300 may include determining whether a difference between the current downlink traffic and the predicted downlink traffic is within a pre-defined confidence interval. In an embodiment, the method 300 may include determining the difference between the downlink traffic at the current time instance and the predicted downlink traffic for the pre-defined time interval. Further, the method 300 may include comparing the difference with the pre-defined confidence interval. If the difference is within the pre-defined confidence interval, the method 300 may proceed to step 308. Else, the method 300 may proceed to step 310.

Referring to FIG. 3, at step 308, the method 300 may include setting a sustained time period as a first time period for identifying the power consumption strategy at the radio unit 104. At step 310, the method 300 may include setting the sustained time period as a second time period for identifying the power consumption strategy at the radio unit 104. In an embodiment, the second time period is greater than the first time period. For example, the first time period may be 10 minutes, and the second time period may be 30 minutes. In an embodiment, the first time period and the second time period may be configurable based at least on the difference between the downlink traffic at the current time instance and the predicted downlink traffic.

It may be appreciated that the steps shown in FIG. 3 are merely illustrative. Other suitable steps may be used for the same, if desired. Moreover, the steps of the method 300 may be performed in any order and may include additional steps.

Figure 4A:
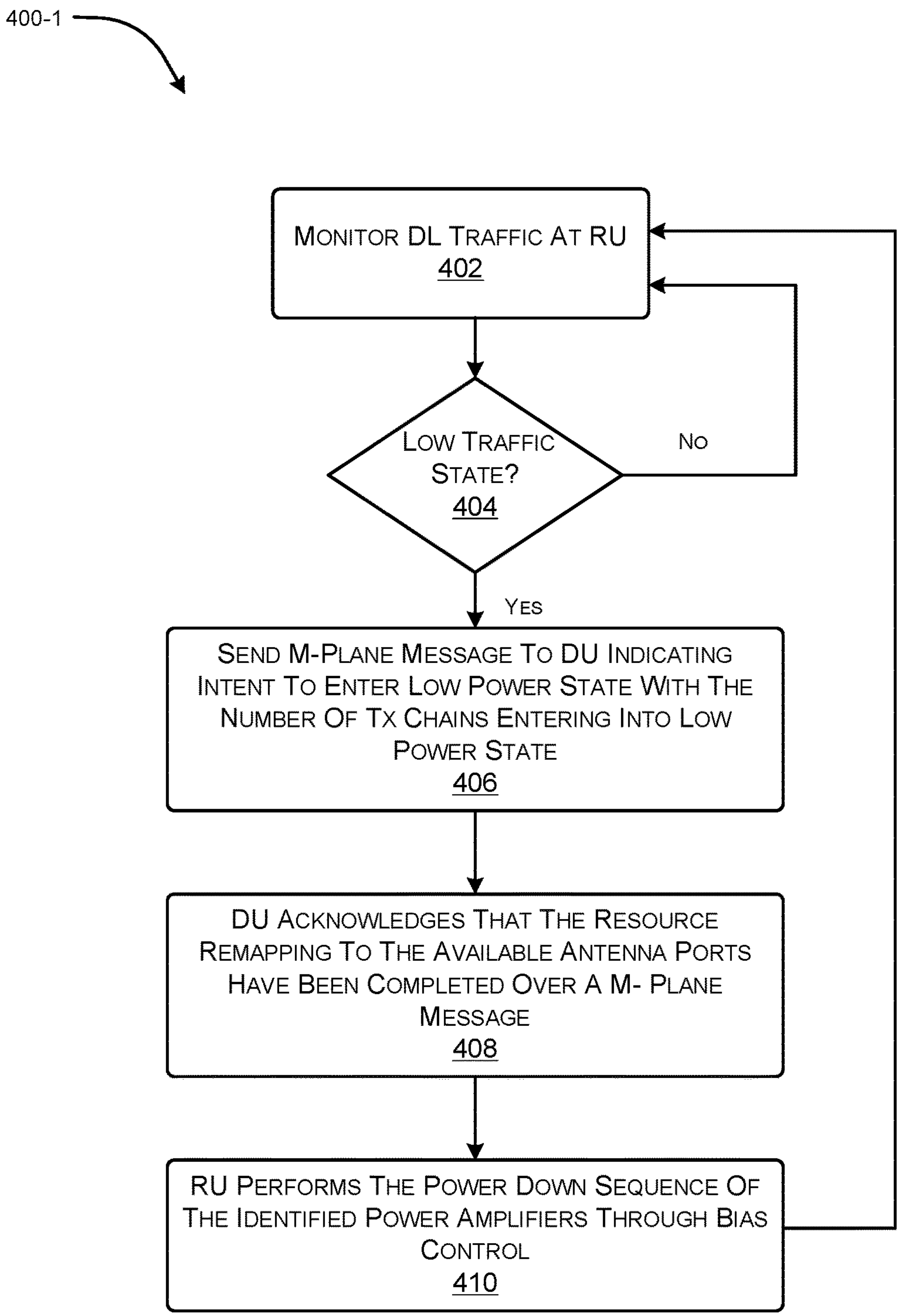
FIG. 4A illustrates an exemplary flow diagram of a method for implementing a first power consumption policy, in accordance with an embodiment of the present disclosure.

FIG. 4A illustrates an exemplary flow diagram of a method 400-1 for implementing a first power consumption policy at the radio unit 104, in accordance with an embodiment of the present disclosure. In particular, the radio unit 104 may be configured to select a power consumption policy from among a first power consumption policy, a second power consumption policy, and/or a third power consumption policy. FIG. 4A corresponds to the method 400-1 for implementing the first power consumption policy at the radio unit 104.

Referring to FIG. 4A, at step 402, the method 400-1 may include monitoring a downlink traffic at the radio unit 104. In an embodiment, the monitoring may be performed by the system (for example, the system 202 or the processor 220 of the system 202). Additionally or alternatively, the monitoring may be performed by the radio unit 104. In an embodiment, the monitoring may be performed continuously. In another embodiment, the monitoring may be performed periodically after a pre-set time slot. Based on the monitoring, the method 400-1 may include determining a low traffic state of the radio unit 104 at step 404. In an embodiment, the low traffic state of the radio unit 104 may be determined based on a pre-defined threshold for the monitored downlink traffic for a pre-configured time period. In an embodiment, if the monitored downlink traffic is within the pre-defined threshold for the pre-configured time period, the system 202 or the radio unit 104 may determine the low traffic state of the radio unit 104. As an example discussed above, if the monitored downlink traffic or the downlink occupancy is 36.6% for 30 minutes, it may be considered that the radio unit 104 is in the low traffic state. In an embodiment, if the low traffic state of the radio unit 104 is determined at step 404, the method 400-1 may proceed to step 406. Else, the method 400-1 may include continuing to monitor the downlink traffic at the radio unit 104 (step 402).

Referring to FIG. 4A, at step 406, the method 400-1 may include sending an M-plane message to a distributed unit (for example, the radio resource scheduler 116 of FIG. 1B or the distributed unit 106 of FIG. 1A). In an embodiment, the radio unit 104 may be configured to apply the first power consumption policy by way of the method 400-1. In such an embodiment, the M-plane message may indicate an intent of the radio unit 104 to enter a low power state for power consumption. The radio unit 104 may enter the low power state based on applying the first power consumption policy. In an embodiment, the first power consumption policy may include shutting down a component or a combination of components associated with the radio unit 104. For example, a number of transmit chains may be shut down, a number of antenna ports may be shut down, and/or a number of power amplifiers may be shut down. In an embodiment, the first power consumption policy may include identifying the number of antenna ports to be turned off or shut down. In such an embodiment, the M-plane message to the distributed unit 106 may indicate the intent of the radio unit 104 to enter the low power state with the identified number of antenna ports entering into low power state.

Further, at step 408, the method 400-1 may include receiving a response from the distributed unit 106. In an embodiment, the response may include an acknowledgement that resource remapping to available components or combination of components associated with the radio unit 104 have been completed. In an embodiment, in response to receiving the message from the system 202 or the radio unit 104 indicating the intent of the radio unit 104 to enter the low power state, the distributed unit 106 may schedule and/or remap resources to available antenna ports in order to continue to serve the active computing devices (for example, the computing devices 102 of FIG. 1A). In an embodiment, the response may include an M-plane message.

transmit chains and/or the antenna ports and/or the power amplifiers may not be completely disabled, and may transition from active to idle and back to active state multiple times.

In an embodiment, the method 400-1 may include continuously monitoring the downlink traffic at the radio unit 104. In case the downlink traffic increases, for example, the system 202 and/or the radio unit 104 may detect a high traffic state at the radio unit 104, then the radio unit 104 may identify the antenna ports to be enabled that were initially disabled to consume power. In such an embodiment, the radio unit 104 may send an M-plane message to the distributed unit 106 to indicate an intent of the radio unit 104 to enable the identified antenna ports to serve the increasing traffic demand. Therefore, the radio unit 104, based on the monitored downlink traffic, may switch between power consumption policies.

Example Estimated Power Reduction Based on First Power Consumption Policy

Considering that each transmitter delivers 40 Watt (46 dBm) power per antenna port. In a TDD system, there would be circuits for downlink/uplink mode control after a power amplifier that would add additional loss, for example, 2 dB after the power amplifier. To account for the loss, the power amplifier would deliver extra power, in this case, 46+2=48 dBm (63 Watts). In an 8T8R TDD radio unit, the total power delivered by the power amplifier would be 63*8=504 Watt.

Based on applying the first power consumption policy, as explained above with reference to FIG. 4A, the radio unit 104 may be configured to efficiently manage power consumption. The below table shows the percentage power savings when a number of power amplifiers are turned off, or instead switched to an idle state in an 8T8R configuration. As an example, when 4 power amplifiers are turned off, 47.49% of the overall system power consumption is reduced. It may be understood that for other types of configurations such as, but not limited to, 4T4R, 16T16R, or the like, the overall power savings may be calculated in a similar manner.

TABLE 5

| PA efficiency calculation | | #Active PAS | PA output power (W) | Total power consumption (W) | Power savings for the PA section (%) | Overall power savings (%) |
|---|---|---|---|---|---|---|
| Vdd (V) | 48 | 1 | 63.1 | 118.0 | 87.5 | 83.10 |
| Pout (dBm) | 46 | 2 | 126.2 | 236.0 | 75 | 71.23 |
| Post PA loss | 2 | 3 | 189.3 | 354.1 | 62.5 | 59.36 |
| PAout (W) | 63.1 | 4 | 252.4 | 472.1 | 50 | 47.49 |
| PA eff | 40 | 5 | 315.5 | 590.1 | 37.5 | 35.61 |
| Pin (W) | 0.15 | 6 | 378.6 | 708.1 | 25 | 23.74 |
| P_DC (W) @ 75% Duty cycle | 118 | 7 | 441.7 | 826.2 | 12.5 | 11.87 |
| Power consumption by rest of the system | 50 | 8 | 504.8 | 944.2 | 0 | 0.00 |

Referring to FIG. 4A, at step 410, the method 400-1 may include configuring the radio unit 104 to enter the low power state by turning off the identified number of antenna ports. It may be appreciated that turning off the identified number of antenna ports may include powering down power amplifiers associated with the identified number of antenna ports. In an embodiment, the radio unit 104 may configure the identified power amplifiers to switch to an idle state or sleep mode in order to reduce the power consumption in low traffic situations. In an embodiment, the identified number of FIG. 4B illustrates an exemplary flow diagram of a method 400-2 for implementing a second power consumption policy at the radio unit 104, in accordance with an embodiment of the present disclosure.

Figure 4B:
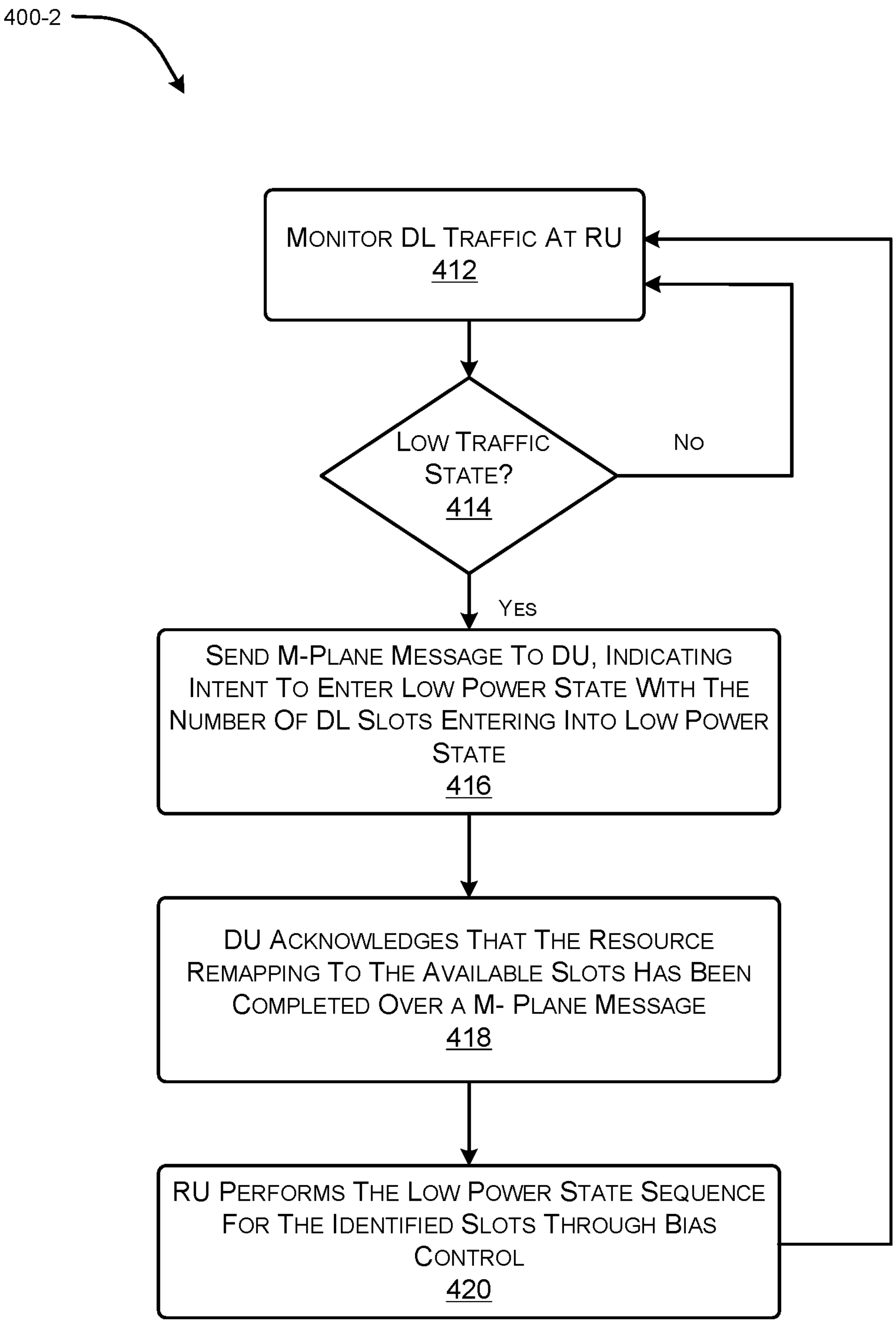
FIG. 4B illustrates an exemplary flow diagram of a method for implementing a second power consumption policy, in accordance with an embodiment of the present disclosure.

Referring to FIG. 4B, at step 412, the method 400-2 may include monitoring a downlink traffic at the radio unit 104. In an embodiment, the monitoring may be performed by the system (for example, the system 202 or the processor 220 of the system 202). Additionally or alternatively, the monitoring may be performed by the radio unit 104. In an embodiment, the monitoring may be performed continuously. In another embodiment, the monitoring may be performed periodically after a pre-set time slot. Based on the monitoring, the method 400-2 may include determining a low traffic state of the radio unit 104 at step 414. In an embodiment, the low traffic state of the radio unit 104 may be determined based on a pre-defined threshold for the monitored downlink traffic for a pre-configured time period. In an embodiment, if the monitored downlink traffic is within the pre-defined threshold for the pre-configured time period, the system 202 or the radio unit 104 may determine the low traffic state of the radio unit 104. In an embodiment, if the low traffic state of the radio unit 104 is determined at step 414, the method 400-2 may proceed to step 416. Else, the method 400-2 may include continuing to monitor the downlink traffic at the radio unit 104 (step 412). It may be appreciated that steps 412 and 414 of the method 400-2 correspond to the steps 402 and 404 of the method 400-1, respectively, and hence, may not be described in detail again for the sake of brevity.

Referring to FIG. 4B, at step 416, the method 400-2 may include sending an M-plane message to a distributed unit (for example, the radio resource scheduler 116 of FIG. 1B or the distributed unit 106 of FIG. 1A). In an embodiment, the radio unit 104 may be configured to apply the second power consumption policy by way of the method 400-2. In such an embodiment, the M-plane message may indicate an intent of the radio unit 104 to enter a low power state for power consumption. The radio unit 104 may enter the low power state based on applying the second power consumption policy. In an embodiment, the second power consumption policy may include reducing a number of downlink slots associated with the radio unit 104. During peak traffic hours, it may be necessary to provide all the available downlink slots to meet user demand. Once power consumption policy is triggered in response to the low traffic state of the radio unit 104, traffic may be consolidated on fewer downlink slots and the unused downlink slots may be disabled. In an embodiment, the second power consumption policy may include identifying the number of downlink slots to be reduced based on the low traffic state of the radio unit 104. In such an embodiment, the M-plane message to the distributed unit 106 may indicate the intent of the radio unit 104 to enter the low power state with the identified number of downlink slots entering into low power state.

Further, at step 418, the method 400-2 may include receiving a response from the distributed unit 106. In an embodiment, the response may include an acknowledgement that resource remapping to available downlink slots associated with the radio unit 104 have been completed. In an embodiment, in response to receiving the message from the system 202 or the radio unit 104 indicating the intent of the radio unit 104 to enter the low power state, the distributed unit 106 may schedule and/or remap resources to available downlink slots in order to continue to serve the user demand, i.e., the active computing devices 102. In an embodiment, the response may include an M-plane message.

Referring to FIG. 4B, at step 420, the method 400-2 may include configuring the radio unit 104 to enter the low power state by reducing the identified number of downlink slots. It may be understood that while all the power amplifiers are kept in an active state or an idle state based on requirements, the number of downlink slots may be reduced based on the second power consumption policy in accordance with the traffic condition. Reducing the number of downlink slots will reduce the total instantaneous bandwidth that the radio unit 104 can utilize on the downlink, but also reduce the power that would otherwise be consumed.

In an embodiment, the method 400-2 may include continuously monitoring the downlink traffic at the radio unit 104. In case the downlink traffic increases, for example, the system 202 and/or the radio unit 104 may detect a high traffic state at the radio unit 104, then the radio unit 104 may identify the downlink slots to be allocated to serve the increasing traffic demand. In such an embodiment, the radio unit 104 may send an M-plane message to the distributed unit 106 to indicate an intent of the radio unit 104 to switch to a high power state with the identified downlink slots entering into the high power state to serve the increasing traffic demand. Therefore, the radio unit 104, based on the monitored downlink traffic, may switch between a low power state and a high power state dynamically.

Example Estimated Power Consumption Based on Applying the Second Power Consumption Policy In a normal condition, the downlink/uplink slots may be occupied as per the below table, where 14 out of 20 slots may be configured as downlink.

TABLE 6

| TS 0 | TS 1 | TS 2 | TS 3 | TS 4 | TS 5 | TS 6 | TS 7 | TS 8 | TS 9 |
|---|---|---|---|---|---|---|---|---|---|
| DL | DL | DL | DL | DL | DL | DL | S | UL | UL |
| TS 10 | TS 11 | TS 12 | TS 13 | TS 14 | TS 15 | TS 16 | TS 17 | TS 18 | TS 19 |
| DL | DL | DL | DL | DL | DL | DL | S | UL | UL |

When low traffic is detected, for example, with average 100 PRB occupancy, or 100/273=36.6% of the peak traffic, it is possible to allocate all the PRBs, but the power amplifier may be set to low power state for (100-36.6)=63.4% of the downlink slots=round (14*0.634)=8 slots. The below table may indicate this condition for reduce timeslot usage.

TABLE 7

| TS 0 | TS 1 | TS 2 | TS 3 | TS 4 | TS 5 | TS 6 | TS 7 | TS 8 | TS 9 |
|---|---|---|---|---|---|---|---|---|---|
| Idle | Idle | Idle | Idle | DL | DL | DL | S | UL | UL |
| TS 10 | TS 11 | TS 12 | TS 13 | TS 14 | TS 15 | TS 16 | TS 17 | TS 18 | TS 19 |
| Idle | Idle | Idle | Idle | DL | DI | DL | S | UL | UL |

In an embodiment, when the timeslot is in an idle state, the power amplifier bias may be set to a very low current state and the radio frequency input signal may be reduced to zero. This ensures that the idle state power consumption of the power amplifier is close to zero, i.e., not completely disabled. With this power consumption policy, the power reduction may be 8/14*504=288 Watt. For example, the below table indicates the overall system power saving with this power consumption policy.

TABLE 8

| # DL slots | Total output power (W) | Total power consumption (W) | Power savings for the PA section (%) | Overall power savings (%) |
|---|---|---|---|---|
| 1 | 72.1 | 134.9 | 85.71 | 81.40 |
| 2 | 144.2 | 269.8 | 71.43 | 67.84 |
| 3 | 216.3 | 404.7 | 57.14 | 54.27 |
| 4 | 288.4 | 539.5 | 42.86 | 40.70 |

TABLE 8-continued

| # DL slots | Total output power (W) | Total power consumption (W) | Power savings for the PA section (%) | Overall power savings (%) |
|---|---|---|---|---|
| 5 | 360.5 | 674.4 | 28.57 | 27.13 |
| 6 | 432.7 | 809.3 | 14.29 | 13.57 |
| 7 | 504.8 | 944.2 | 0.00 | 0.00 |

In accordance with embodiments of the present disclosure, the radio unit 104 may be configured to apply a third power consumption policy. In an embodiment, the third power consumption policy may be a combination of the first power consumption policy and the second power consumption policy. For example, a combination of components associated with the radio unit 104 may be powered down. That is, a number of antenna ports in combination with a number of downlink slots may be reduced or powered down by way of the third power consumption policy at the radio unit 104.

Further, in accordance with embodiments of the present disclosure, it may be understood that the radio unit 104 may be configured to select the power consumption policy based on a computation of power saving potential with respect to each of the first power consumption policy, the second power consumption policy, and the third power consumption policy. In an embodiment, the radio unit 104 may apply the power consumption policy for a pre-configured time period, for example, based on the actual downlink traffic and the predicted downlink traffic. In an embodiment, the radio unit 104 may apply the power consumption policy for a first time period based on a difference between the actual downlink traffic at the current time instance and the predicted downlink traffic for the pre-defined time interval being within the pre-configured confidence interval. Alternatively, the radio unit 104 may apply the power consumption policy for a second time period based on the difference being greater than the pre-configured confidence interval. In an embodiment, the second time period may be greater than the first time period. In an embodiment, the radio unit 104 may apply the power consumption policy until an external message is received at the radio unit 104, for example, from the centralized unit (such as the centralized unit 108 of FIG. 1A) or the distributed unit 106 instructing the radio unit 104 to proceed otherwise.

As an example, but not limited to, the below table indicates the total power consumption and power saving with respect to the third power consumption policy, i.e. the number of active power amplifiers and the number of active downlink slots.

TABLE 9

| TDD Duty Cycle | Traffic Condition | # PAS (Powered ON) | # Time slots (DL only) | Total Power Consumption (W) | Power Saving (%) |
|---|---|---|---|---|---|
| 100% | Full | 8 | 14 | 1258.91 | 0 |
| 75% | Full | 8 | 14 | 944.19 | 25 |
| 75% | Option-1 7/8 | 7 | 14 | 826.16 | 34.38 |
| 75% | Option-1 6/8 | 6 | 14 | 708.14 | 43.75 |
| 75% | Option-1 5/8 | 5 | 14 | 590.12 | 53.13 |
| 75% | Option-1 4/8 | 4 | 14 | 472.09 | 62.5 |
| 75% | Option-1 3/8 | 3 | 14 | 354.07 | 71.88 |
| 75% | Option-1 2/8 | 2 | 14 | 236.05 | 81.25 |
| 75% | Option-1 1/8 | 1 | 14 | 118.02 | 90.63 |
| 75% | Option-2 13/14 | 8 | 13 | 876.74 | 30.36 |
| 75% | Option-2 12/14 | 8 | 12 | 809.30 | 35.71 |
| 75% | Option-2 11/14 | 8 | 11 | 741.86 | 41.07 |

TABLE 9-continued

| TDD Duty Cycle | Traffic Condition | # PAS (Powered ON) | # Time slots (DL only) | Total Power Consumption (W) | Power Saving (%) |
|---|---|---|---|---|---|
| 75% | Option-2 10/14 | 8 | 10 | 674.42 | 46.43 |
| 75% | Option-2 9/14 | 8 | 9 | 606.98 | 51.79 |
| 75% | Option-2 8/14 | 8 | 8 | 539.53 | 57.14 |
| 75% | Option-2 7/14 | 8 | 7 | 472.09 | 62.5 |
| 75% | Option-2 6/14 | 8 | 6 | 404.65 | 67.86 |
| 75% | Option-2 5/14 | 8 | 5 | 337.21 | 73.21 |
| 75% | Option-2 4/14 | 8 | 4 | 269.77 | 78.57 |
| 75% | Option-2 3/14 | 8 | 3 | 202.33 | 83.93 |
| 75% | Option-2 2/14 | 8 | 2 | 134.88 | 89.29 |
| 75% | Option-2 1/14 | 8 | 1 | 67.44 | 94.64 |

The blocks of the flow diagram shown in FIGS. 4A and 4B have been arranged in a generally sequential manner for ease of explanation; however, it is to be understood that this arrangement is merely exemplary, and it should be recognized that the processing associated with methods 400-1 and 400-2 may occur in a different order (for example, where at least some of the processing associated with the blocks is performed in parallel and/or in an event-driven manner). Further, it may be appreciated that the steps shown in FIGS. 4A-4B are merely illustrative. Other suitable steps may be used for the same, if desired. Moreover, the steps of the methods 400-1 and 400-2 may be performed in any order and may include additional steps.

Figure 5:
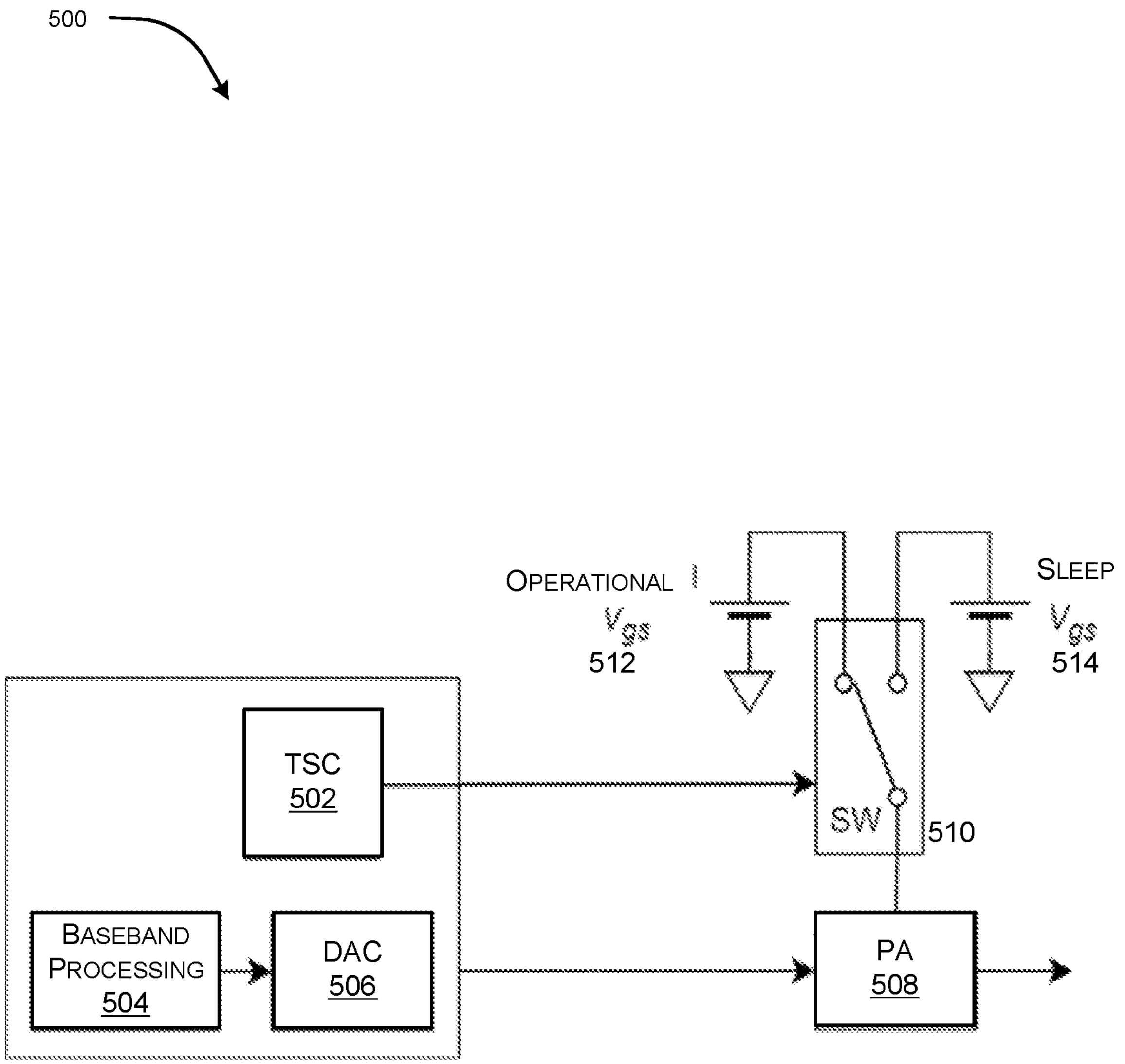
FIG. 5 illustrates an exemplary system architecture for implementing a bias control mechanism, in accordance with an embodiment of the present disclosure.

FIG. 5 illustrates an exemplary system architecture 500 for implementing a bias control mechanism, in accordance with an embodiment of the present disclosure. In an embodiment, the radio unit 104 may implement the bias control mechanism, as explained with reference to FIG. 5.

In an embodiment, the exemplary system architecture 500 may correspond to a 5G NR base station. The 5G NR base station may include, a TDD switching controller (TSC) 502, a baseband processing module 504, a digital to analog converter (DAC) 506, a power amplifier 508, and a switch 510.

Referring to FIG. 5, the TSC 502 may provide the boundary conditions of downlink and uplink slots of one radio frame. The baseband processing module 504 may process the IQ symbols before converting them to analog domain. The DAC 506 may convert the digital signal to an analog signal. Further, the switch 510 connects the gate of the power amplifier 508 and switches between an optimal voltage ($V_{gs1}$) and cut off voltage $V_{gs2}$. In an embodiment, the optimal voltage ($V_{gs1}$) may be greater than the cut off voltage ($V_{gs2}$). In an embodiment, the TSC 502 controls the switch 510.

In an embodiment, as discussed above, the radio unit 104 may determine a power consumption policy from among a first power consumption policy, a second power consumption policy, and a third power consumption policy, for efficient power management at the radio unit 104. Based on the determined power consumption policy, the radio unit 104 may send an M-plane message to the distributed unit 106 to indicate the intent of the radio unit 104 to enter a low power state, as discussed above with reference to FIGS. 4A and 4B. In response to receiving an acknowledgement from the distributed unit 106, the radio unit 104 may apply the identified power consumption policy in the manner as explained below.

In an embodiment, in an operational mode, the power amplifier 508 drives a high drain current from the power supply. To operate the power amplifier 508 in the operational mode, the TSC 502 sends a control signal to the switch 510 which connects the gate of the power amplifier 508 with an operational $V_{gs}$ 512. In an embodiment, the operational $V_{gs}$ 512 may correspond to the optimal voltage ($V_{gs1}$). It may be understood that in the operational mode, the power consumption by the power amplifier 508 is high to deliver the desired output power.

In a sleep mode or an idle state, the power amplifier 508 drives negligible to zero drain current from the power supply. To operate the power amplifier 508 in the sleep mode, the TSC 502 sends a control signal to the switch 510 which connects the gate of the power amplifier 508 with a sleep $V_{gs}$ 514. In an embodiment, the sleep $V_{gs}$ 514 may correspond to the cut off voltage ($V_{gs2}$). It may be understood that in the sleep mode, the power consumption by the power amplifier 508 is negligible as no output power is delivered.

Therefore, it is possible to effectively modulate the gate of the power amplifier 508, i.e. $V_{gs}$, and therefore, reduce the bias on the power amplifier 508.

The methods and techniques described here may be implemented in digital electronic circuitry, field programmable gate array (FPGA), or with a programmable processor (for example, a special-purpose processor or a general-purpose processor such as a computer) firmware, software, or in combinations of them. Apparatus embodying these techniques may include appropriate input and output devices, FPGA, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system, explained in detail with reference to FIG. 6, including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, and flash memory devices; magnetic disks such as internal hard disks and removable disks; and magneto-optical disks. Any of the foregoing may be supplemented by, or incorporated in, specially designed application-specific integrated circuits (ASICs).

Figure 6:
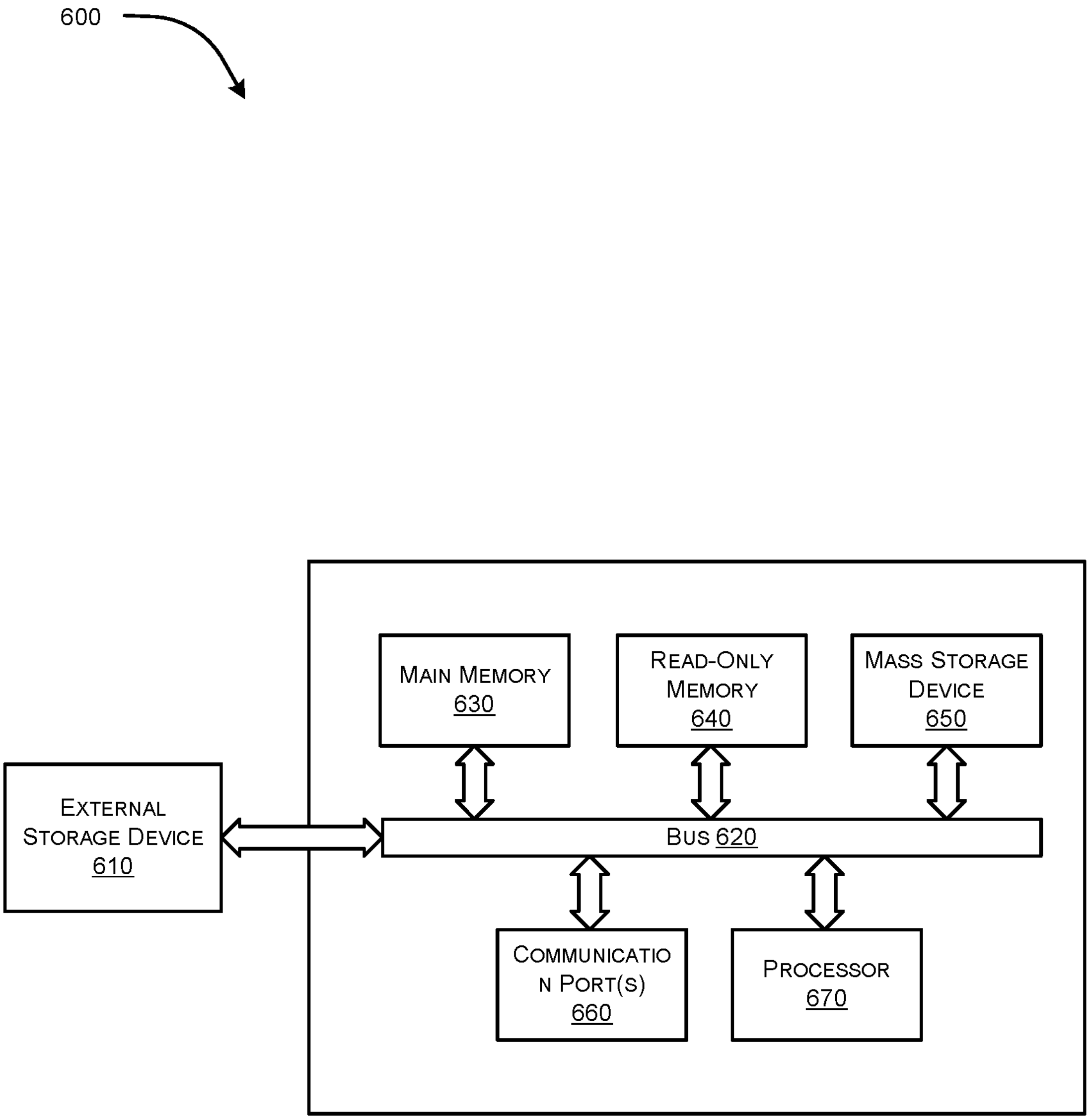
FIG. 6 illustrates an exemplary computer system in which or with which the proposed mechanism may be implemented, in accordance with an embodiment of the present disclosure.

In particular, FIG. 6 illustrates an exemplary computer system 600 in which or with which embodiments of the present disclosure may be utilized. The computing system 600 may be implemented as or within the system 202 and/or the radio unit 104 and/or any suitable network device described in accordance with embodiments of the present disclosure. As depicted in FIG. 6, the computer system 600 may include an external storage device 610, a bus 620, a main memory 630, a read-only memory 640, a mass storage device 650, communication port(s) 660, and a processor 670. A person skilled in the art will appreciate that the computer system 600 may include more than one processor 670 and communication ports 660. The processor 670 may include various modules associated with embodiments of the present disclosure. The communication port(s) 660 may be any of an RS-232 port for use with a modem-based dialup connection, a 10/100 Ethernet port, a Gigabit or 10 Gigabit port using copper or fiber, a serial port, a parallel port, or other existing or future ports. The communication port(s) 660 may be chosen depending on a network, such a Local Area Network (LAN), Wide Area Network (WAN), or any network to which the computer system 600 connects.

In an embodiment, the main memory 630 may be Random Access Memory (RAM), or any other dynamic storage device commonly known in the art. The read-only memory 640 may be any static storage device(s) e.g., but not limited to, a Programmable Read Only Memory (PROM) chips for storing static information e.g., start-up or basic input output system (BIOS) instructions for the processor 670. The mass storage device 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces).

In an embodiment, the bus 620 communicatively couples the processor 670 with the other memory, storage, and communication blocks. The bus 620 may be, e.g. a Peripheral Component Interconnect PCI)/PCI Extended (PCI-X) bus, Small Computer System Interface (SCSI), USB, or the like, for connecting expansion cards, drives, and other subsystems as well as other buses, such a front side bus (FSB), which connects the processor 670 to the computer system 600.

In another embodiment, operator and administrative interfaces, e.g. a display, keyboard, and a cursor control device, may also be coupled to the bus 620 to support direct operator interaction with the computer system 600. Other operator and administrative interfaces may be provided through network connections connected through the communication port(s) 660. Components described above are meant only to exemplify various possibilities. In no way should the aforementioned exemplary computer system 600 limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Present Disclosure

The present disclosure provides an efficient solution for minimizing power consumption at a fifth generation (5G) base station, i.e., a radio unit.

The present disclosure optimizes power consumption without any performance degradation.

The present disclosure considers the state of network traffic demand to intelligently control a state of a power amplifier and a transmitter chain for power consumption at a radio unit.

ABBREVIATION TABLE

| S. No. | Abbreviation | Full Form |
|---|---|---|
| 1. | NR | New Radio |
| 2. | PA | Power Amplifier |
| 3. | QoS | Quality of Service |
| 4. | OFDM | Orthogonal Frequency Division Multiplexing |
| 5. | PAPR | Peak to Average Power Ratio |
| 6. | MIMO | Multiple Input Multiple Output |
| 7. | RU | Radio Unit |
| 8. | RF | Radio Frequency |
| 9. | TDD | Time Division Duplexing |
| 10. | 3GPP | Third Generation Partnership Project |
| 11. | GPS | Global Positioning System |
| 12. | VR | Virtual Reality |
| 13. | AR | Augmented Reality |
| 14. | RAN | Radio Access Network |
| 15. | O-RAN | Open Radio Access Network |
| 16. | RLC | Radio Link Control |
| 17. | MAC | Media Access Control |
| 18. | M-plane | Management Plane |
| 19. | PRB | Physical Resource Block |
| 20. | TS | Time Slot |
| 21. | SF | Subframe |
| 22 | OAM | Operations Administration and Maintenance |
| 23. | RAM | Random Access Memory |
| 24. | EPROM | Erasable Programmable Red-Only Memory |
| 25. | LNA | Low Noise Amplifier |
| 26. | I/O | Input/Output |
| 27. | IQ | In and Quadrature phase |
| 28. | CPRI | Common Public Radio Interface |
| 29. | eCPRI | Enhanced Common Public Radio Interface |
| 30. | O-RU | Open Radio Unit |
| 31. | U-plane | User Plane |
| 32. | BW | Bandwidth |
| 33. | DL | Downlink |
| 34. | UL | Uplink |
| 35. | TSC | Time Division Duplexing (TDD) Switching Control |
| 36. | DAC | Digital to Analog Converter |
| 37. | FPGA | Field Programmable Gate Array |
| 38. | ASIC | Application Specific Integrated Circuit |
| 39. | LAN | Local Area Network |
| 40. | WAN | Wide Area Network |
| 41. | RAM | Random Access Memory |
| 42. | PROM | Programmable Read Only Memory |
| 43. | PATA | Parallel Advanced Technology Attachment |
| 44. | SATA | Serial Advanced Technology Attachment |
| 45. | USB | Universal Serial Bus |
| 46. | PCI | Peripheral Component Interconnect |
| 47. | PCI-X | Peripheral Component Interconnect Extended |
| 48. | SCSI | Small Computer System Interface |
| 49. | FSB | Front Side Bus |
| 50. | BIOS | Basic Input Output System |
| 51. | SS | Special Subframe |

We claim:

1. A method for managing power consumption in a wireless communication network, comprising:

monitoring, by a processor, a downlink traffic at a radio unit in the wireless communication network;

determining, by the processor, a low traffic state of the radio unit based on a pre-defined threshold for the monitored downlink traffic for a pre-configured time period, wherein determining, by the processor, the low traffic state of the radio unit comprises:

determining, by the processor, the downlink traffic at the radio unit at a current time instance;

estimating, by the processor, a predicted downlink traffic at the radio unit for a pre-defined time interval, wherein the current time instance is prior to the pre-defined time interval; and determining, by the processor, the low traffic state of the radio unit based on whether a difference between the downlink traffic at the current time instance and the predicted downlink traffic for the pre-defined time interval is within a pre-defined confidence interval; and configuring, by the processor, the radio unit to enter a low power state based on the determined low traffic state, wherein configuring the radio unit comprises:

selecting, by the processor, a power consumption policy; and applying, by the processor, the selected power consumption policy at the radio unit for a pre-defined time period.

2. The method as claimed in claim 1, comprising:

in response to a positive determination, applying, by the processor, the power consumption policy at the radio unit for a first time period;

else, applying, by the processor, the power consumption policy at the radio unit for a second time period, the second time period being greater than the first time period.

3. The method as claimed in claim 1, wherein estimating, by the processor, the predicted downlink traffic is based on historical data pattern of the downlink traffic at the radio unit.

4. The method as claimed in claim 1, wherein the power consumption policy comprises at least one of a first power consumption policy, a second power consumption policy, and a third power consumption policy.

5. The method as claimed in claim 4, wherein selecting, by the processor, the power consumption policy is based on a power saving potential of each of the first power consumption policy, the second power consumption policy, and the third power consumption policy, and wherein the third power consumption policy is a combination of the first power consumption policy and the second power consumption policy.

6. The method as claimed in claim 4, wherein applying, by the processor, the power consumption policy at the radio unit comprises applying, by the processor, the first power consumption policy at the radio unit based on the selection, and wherein applying the first power consumption policy comprises:

identifying, by the processor, a number of active antenna ports to be turned off;

sending, by the processor, a message to a distributed unit in the wireless communication network, the message indicating an intent for the radio unit to enter the low power state with the identified number of active antenna ports entering into the low power state;

receiving, by the processor, a response from the distributed unit, the response indicating that resource remapping to available antenna ports is completed; and configuring, by the processor, the radio unit to turn off the identified number of antenna ports.

7. The method as claimed in claim 6, wherein configuring, by the processor, the radio unit to turn off the identified number of antenna ports comprises configuring, by the processor, the radio unit to switch power amplifiers associated with the identified number of antenna ports to an idle state.

8. The method as claimed in claim 4, wherein applying, by the processor, the power consumption policy at the radio unit comprises applying, by the processor, the second power consumption policy at the radio unit based on the selection, and wherein applying the second power consumption policy comprises:

identifying, by the processor, a number of downlink slots to be reduced;

sending, by the processor, a message to a distributed unit indicating an intent for the radio unit to enter the low power state with the number of downlink slots entering into the low power state;

receiving, by the processor, a response from the distributed unit, the response indicating that resource remapping to available downlink slots is completed; and configuring, by the processor, the radio unit to reduce the identified number of downlink slots.

9. A system for managing power consumption in a wireless communication network, the system comprising:

a processor; and a memory coupled to the processor, wherein the memory comprises processor-executable instructions that when executed by the processor cause the processor to:

monitor a downlink traffic at a radio unit in the wireless communication network;

determine a low traffic state of the radio unit based on a pre-defined threshold for the monitored downlink traffic for a pre-configured time period, wherein determining the low traffic state of the radio unit comprises:

determine the downlink traffic at the radio unit at a current time instance;

estimate a predicted downlink traffic at the radio unit for a pre-defined time interval, wherein the current time instance is prior to the pre-defined time interval; and determine the low traffic state of the radio unit based on whether a difference between the downlink traffic at the current time instance and the predicted downlink traffic for the pre-defined time interval is within a pre-defined confidence interval; and configure the radio unit to enter a low power state based on the determined low traffic state, wherein to configure the radio unit, the processor is configured to:

select a power consumption policy; and apply the selected power consumption policy at the radio unit for a pre-defined time period.

10. The system as claimed in claim 9, wherein the power consumption policy comprises at least one of a first power consumption policy, a second power consumption policy, and a third power consumption policy, wherein the processor is configured to select the power consumption policy based on a power saving potential of each of the first power consumption policy, the second power consumption policy, and the third power consumption policy, and wherein the third power consumption policy is a combination of the first power consumption policy and the second power consumption policy.

11. The system as claimed in claim 10, wherein to apply the power consumption policy at the radio unit, the processor is configured to apply the first power consumption policy at the radio unit based on the selection, and wherein to apply the first power consumption policy, the processor is configured to:

identify a number of active antenna ports to be turned off;

send a message to a distributed unit in the wireless communication network, the message indicating an intent for the radio unit to enter the low power state with the identified number of active antenna ports entering into the low power state;

receive a response from the distributed unit, the response indicating that resource remapping to available antenna ports is completed; and configure the radio unit to turn off the identified number of antenna ports.

12. The system as claimed in claim 11, wherein to configure the radio unit to turn off the identified number of antenna ports, the processor is configured to configure the radio unit to switch power amplifiers associated with the identified number of antenna ports to an idle state.

13. The system as claimed in claim 10, wherein to apply the power consumption policy at the radio unit, the processor is configured to apply the second power consumption policy at the radio unit based on the selection, and wherein to apply the second power consumption policy, the processor is configured to:

identify a number of downlink slots to be reduced;

send a message to a distributed unit indicating an intent for the radio unit to enter the low power state with the number of downlink slots entering into the low power state;

receive a response from the distributed unit, the response indicating that resource remapping to available downlink slots is completed; and configure the radio unit to reduce the identified number of downlink slots.

14. A non-transitory computer-readable medium comprising machine-readable instructions that are executable by a processor to:

monitor a downlink traffic at a radio unit in a wireless communication network;

determine a low traffic state of the radio unit based on a pre-defined threshold for the monitored downlink traffic for a pre-configured time period, wherein determining the low traffic state of the radio unit comprises:

determine the downlink traffic at the radio unit at a current time instance;

estimate a predicted downlink traffic at the radio unit for a pre-defined time interval, wherein the current time instance is prior to the pre-defined time interval; and determine the low traffic state of the radio unit based on whether a difference between the downlink traffic at the current time instance and the predicted downlink traffic for the pre-defined time interval is within a pre-defined confidence interval; and configure the radio unit to enter a low power state based on the determined low traffic state, wherein to configure the radio unit, the processor is configured to:

select a power consumption policy; and apply the selected power consumption policy at the radio unit for a pre-defined time period.

* * * * *